United States Patent [19]
Reinecke et al.

[11] 3,837,710
[45] Sept. 24, 1974

[54] ANTI-SKID APPARATUS FOR WHEELS

[75] Inventors: Erich Reinecke, Beinhorn; Fritz Isernhagen, Letter; Alfred Klatt, Ronnenberg; Lutz Weise, Misburg; Karl-Heinz Maisold, Berenbostel, all of Germany

[73] Assignee: Westinghouse Bremsen-und Apparatebau GmbH, Hannover, Germany

[22] Filed: Nov. 30, 1972

[21] Appl. No.: 310,681

[30] Foreign Application Priority Data
Dec. 27, 1971  Germany............................ 2164833

[52] U.S. Cl.............................. 303/21 F, 188/181 A
[51] Int. Cl............................................... B60t 8/12
[58] Field of Search... 188/181 A; 303/21 F, 21 CE, 303/21 CG, 21 BE, 3

[56] References Cited
UNITED STATES PATENTS

| | | | |
|---|---|---|---|
| 3,473,850 | 10/1969 | Lawrie | 303/21 CG |
| 3,556,609 | 1/1971 | MacDuff | 303/21 F |
| 3,586,388 | 6/1971 | Stelzer | 303/21 F |
| 3,655,246 | 4/1972 | Keller | 303/21 F |
| 3,671,085 | 6/1972 | Pasek et al. | 303/21 F |
| 3,729,233 | 4/1973 | Mangold | 303/21 F |

Primary Examiner—Duane A. Reger
Attorney, Agent, or Firm—R. W. McIntire, Jr.

[57] ABSTRACT

Anti-skid apparatus for vehicle wheels including wheel-slip threshold sensor means for detecting the value of deceleration rate of a vehicle wheel at which wheel-slip, due to braking action and prevailing road surface condition, becomes imminent and for emitting a control impulse accordingly, said apparatus being operable responsively to said control impulse for first causing a reduction of brake-applying pressure to a reduced degree at which neutralization of the wheel-slip tendency is initiated, secondly for maintaining the reduced brake-applying pressure at the reduced degree until the wheel resumes normal rotation, and thirdly for effecting restoration of brake-applying pressure at a progressive rate compatible with the existing road friction condition.

6 Claims, 5 Drawing Figures

ANTI-SKID APPARATUS FOR WHEELS

BACKGROUND OF THE INVENTION

Characteristic of presently known anit-skid apparatus is the fact that subsequently to a reduction of brake-applying pressure for preventing wheel-skid, restoration of braking pressure occurs at a relatively high rate in the low presure range and tends to decrease in the higher pressure range. The high rate of restoration of brake-applying pressure in the lower pressure range may be undesirable, particularly on a road surface having a low static friction coefficient, in that the rapid rate of brake pressure reapplication has the effect of acclerating the wheel too rapidly for the road conditions and thereby renew the wheel-slip tendency. This mode of wheel-slip control, that is, rapid cycling of brake pressure reduction and brake pressure restoration, may cause build up of undesirable oscillations at the wheel axle which is detrimental to riding stability of the vehicle.

SUMMARY OF THE INVENTION

The object of the invention, therefore, is to provide anti-skid control apparatus effective for utilizing braking forces, particularly in the lower pressure ranges, for reducing the stopping distance of the vehicle on a road surface having a low static friction coefficient.

Briefly, the invention comprises apparatus including a pressure differential responsive modulating valve device with throttling means interposed in a brake-applying pressure supply line between an operator's brake valve and a brake control valve which, in turn, is connected serially to a brake cylinder. A wheel-slip threshold sensor, in response to imminency of wheel-slip causes (1) the brake control valve to simultaneously cut off supply and vent the brake cylinder of brake-applying pressure for restoring normal wheel rotation. After a certain amount of wheel-speed recovery, the threshold sensor causes (2) the control valve device to be operated to a lap position for a certain interval of time during which venting of the brake cylinder is also cut off and the wheel is allowed to resume normal slip-free rotation, whereupon said threshold sensor, in response to such resumption of slip-free rotation, causes (3) the control valve device to reconnect the brake cylinder to fluid pressure supply so that pressure in the brake cylinder may be restored to that originally established by the operator. During the initial phase or restoration of brake cylinder pressure to the original pressure, a momentary pressure differential is accordingly establihsed between the inlet and outlet of the modulating device to cause the throttling means therein to be correspondingly adjusted and thereby control flow of fluid pressure supply to the brake cylinder at a restricted rate accordingly until restoration or equalization of original pressure is completed in the brake cylinder, whereupon the throttling means is restored to a normal free-flow position. The anit-skid apparatus functions in cycling fashion in the three-step action just described as long as the road condition conducive to producing wheel-slip prevails. It should be noted that step (2) allows full recovery of normal wheel rotation before resuppplying brake applying pressure, and step (3) restricts such resupply of brake-applying pressure at a rate determined by the road condition itself, thereby providing the most efficient braking action and the shortest stopping distance possible for the existing road conditions. In the drawings, FIG. 1 is a schematic view, partly in section, of one embodiment of the invention;

DESCRIPTION AND OPERATION

Figure 1:
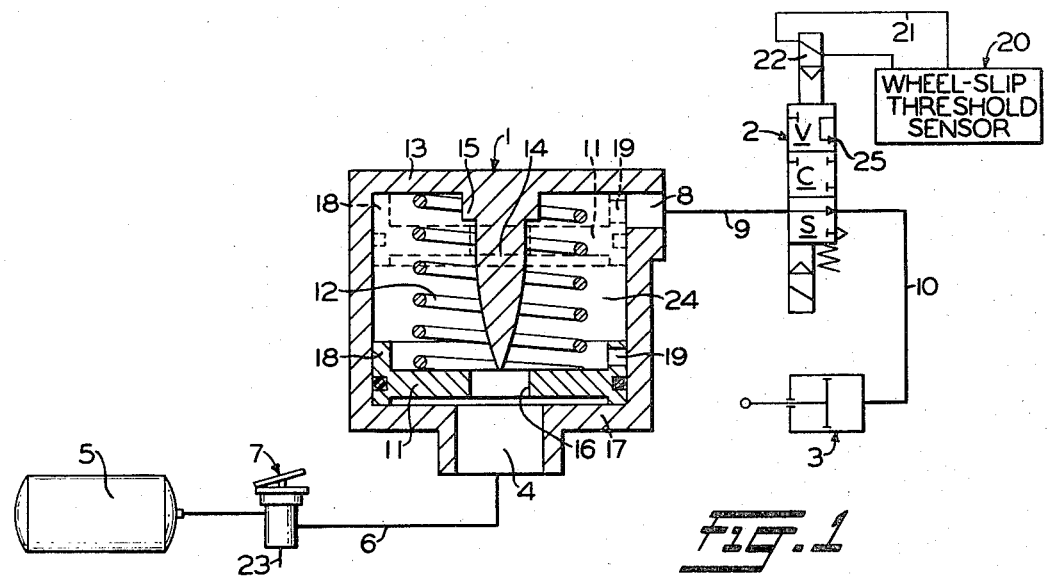

The anti-skid brake control apparatus, as shown in FIG. 1, comprises a fluid pressure modulating valve device 1 installed in the apparatus ahead of a brake control valve device 2 for modulating the operating fluid pressure suppplied through said control valve device to a brake cylinder device 3. An inlet port 4 of the modulating valve device 1 is connected to a source of fluid under pressure 5 via a pipe 6 in which a foot-operated brake valve device 7 is interposed. A delivery port 8 of modulating valve device 1 is connected via a pipe 9 to control valve device 2 which, in turn, is connected via a pipe 10 to the brake cylinder device 3.

The modulating valve device 1 comprises a throttle piston 11 reciprocably movable therein in axial alignment with inelt port 4 toward which said piston is biased by a spring 12 compressed between said piston and an oppositely disposed upper end wall 13 of said modulating valve device. A throttle pin 14 estends coaxially from a base or shoulder 15 formed internally on end wall 13, said pin extending toward a circular opening 16 formed concentrically in piston 11 in axial alignment with inlet port 4.

Throttle pin 14 has an elongated substantially paraboloidal shape with its largest diameter in juxtaposition to the base 15, and gradually diminishes in diameter so as to terminate with a pointed tip or end which lies in a plane coinciding with the upper surface of piston 11, as viewed in the drawing, when said piston is in a normal or full-flow position in abutting contact with a bottom end wall 17 disposed oppositely upper end wall 13 and in which it is shown in the drawing. The diameter of opening 16 is slightly larger than the maximum diameter of throttle pin 14 and smaller than that of base 15 in order that the base end of said pin may be accommodated in said opening when said piston is in a restricted-flow or abutting position against upper end wall 13 in which it is shown in phantom broken outline. Thus, throttle pin 14 and piston 11 cooperate, as will be hereinafter explained, to provide an infinitely variable throttling means.

The upper side of piston 11 is provided with a peripheral rim 18 in which a radially disposed opening 19 is angularly positioned therein so as to register with delivery port 8 in the restricted-flow position of said piston. The brake control valve device 2 is a three-position or three-way solenoid-actuated, spring-returned valve device which is controlled by a wheel-slip threshold sensor device 20 interposed in an electrical circuit 21, which is effective, when closed by said detector device in well known manner, for energizing a solenoid 22 of said brake control valve device.

In operation, when the vehicle brakes (not shonw) are in a released condition, the several devices of the anit-skid apparatus shown in FIG. 1 assume the respective positions in which they are shown. Brake control valve device 2, with its solenoid 22 deenergized, occupies a supply position indicated symbolically by a block designated S in the drawing in which pipe 9 is communicated with pipe 10 so that fluid pressure may be supplied to brake cylinder 3 when brake valve 7 is operated to a fluid pressure supply position. Of course in a released state of the vehicle brakes, brake valve 7 is in a release position in which supply of fluid pressure therethrough from reservoir 2 is cut off and brake cylinder 3 is vented to atmosphere via pipes 9 and 10, modulating device 1, pipe 6 up to said brake valve device, and via a vent port 23 in said brake valve device.

Figure 3:
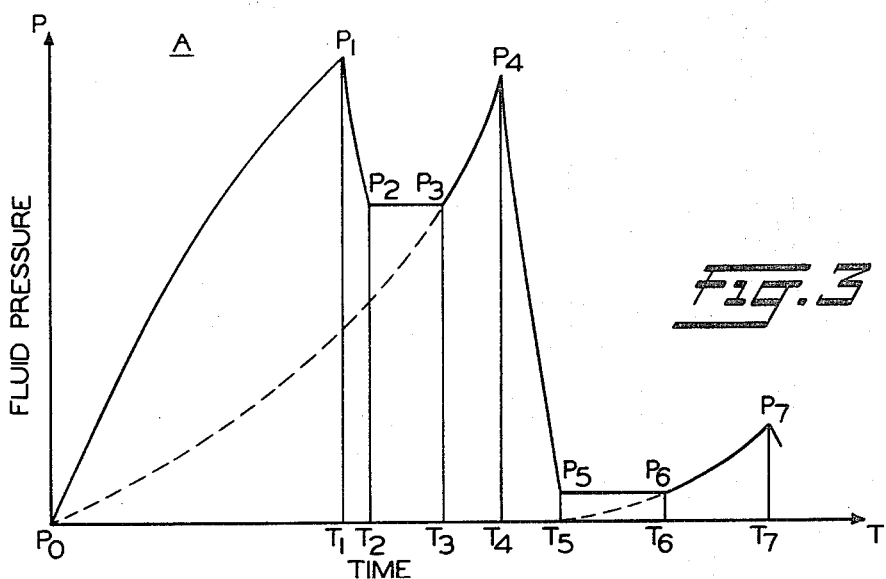
FIG. 3 is a pressure versus time graph relating to the embodiments shown in FIGS. 1 and 2.

By operating brake valve 7 to its supply position, fluid pressure from reservoir 2, at a degree commensurate with the degree to which the operator has opened said brake valve, may flow through pipe 6, inlet port 4 of modulating valve 1, opening 16 in piston 11 (which at this point is in its free-flow flow position) a balance or spring chamber 24 (in which spring 12 is disposed), delivery port 8, pipe 9, control 2 (which is in position S), and pipe 10 to brake cylinder 3. As represented in a pressure (P) versus time (T) graph A shown in FIG. 3, pressure P builds up in brake cylinder 3 after $T_1$ time according to the curve $P_0 - P_1$. Since normally only a nominal pressure differential occurs between inlet port 4 and outlet port 8 during initial supply of fluid pressure to the brake cylinder 3, spring 12 is effective for retaining throttle piston 11 in its free-flow position in which fluid pressure may flow unrestrictedly through the modulating valve device 1.

Assuming that, upon reaching the effective braking pressure $P_1$ at $T_1$, deceleration of the vehicle wheel (not shown) occurs at a rate exceeding a value that leads to skidding of the wheel, that is, the wheel-slip threshold, the threshold sensor 20 responds to such a condition to produce a first control impulse or signal which causes the control valve device 2 to be operated from position S to a vent position designated symbolically by a block V in which brake cylinder 3 is cut off from fluid pressure supply and connected to an atmospheric vent port 25. Assuming, at this point of operation, that the road surface has a high coefficient of static friction, so that, with control valve 2 in position V, fluid pressure in brake cylinder 3 is reduced at a relatively rapid rate represented by the curve $P_1 - P_2$ in graph A, $P_2$ at time $T_2$ representing a point at which rotational deceleration of the wheel is below the value at which wheel-slip occurs. At this point the wheel-slip threshold sensor 20 produces a second control impulse or signal effective for operating control valve device 2 to a closed or cut-off position represented symbolically by the block designated C in FIG. 1, in which brake cylinder 3 is cut off from fluid pressure supply as well as venting. Thus brake pressure in brake cylinder 3 remains at the valiue $P_2$ while the vehicle wheel is progressing toward a normal slip-free rate of rotation corresponding to linear speed of the vehicle, such being represented by the curve $P_2 - P_3$ in graph A, pressure $P_3$ being equivalent to $P_2$.

When, at time $T_3$, the vehicle wheel has resumed a rotational speed substantially corresponding to linear speed of the vehicle, the second control impulse is terminated by the threshold sensor 20, and control valve device 2 is restored to position S in which brake cylinder 3 is again connected to fluid pressure supply via pipes 6 and 9, modulating device 1, and said control valve device. With fluid pressure in brake cylinder 3 equalizing at a relatively rapid rate with the pressure originally established by the brake valve 7 and prevailing, at this time, in chamber 24 of the modulating device 1, a pressure differential is established across the opposite sides of throttle piston 11. As a result of such a pressure differential, throttle piston 11 is moved upwardly, as viewed in the drawing, against the force of spring 12 to a restricted-flow position or until an equilibrium is reached between the forces acting on the opposite sides of said piston. Upward movement of piston 11 relative to throttle pin 14 establishes a fluid flow relationship therebetween or a constricted opening via which fluid pressure now flows at a somewhat restricted rate to brake cylinder 3 wherein pressure begins to increase, but now at a slower rate. As pressure in brake cylinder 3 gradually increases, so does the pressure on the upper side of piston 11, which, once having attained the point of equilibrium, begins to gradually move downwardly toward its normal or full-flow position, above defined. Piston 11, at time $T_4$, that is, when pressure in brake cylinder 3 is restored to to a pressure $P_4$ substantially equivalent to pressure $P_1$, resumes its normal or full-flow position. Moreover, due to the paraboloidal shape of throttle pin 14, as compared to a uniformly tapered, straight sided cone shape, the rate of change in the throttle area between said pin and opening 16 in the throttle piston 11, as the piston is moving toward its free-flow position, is not a linear funciton, but a function in accordance with the curved surface of said pin. Since the gradient of the curve of pin 14 increases at a greater rate toward the apex, the throttle area also increases at a greater rate during the latter movement of piston 11 toward its free-flow position. This phase of the operation is represented by the curve segment $P_3 - P_4$ on graph A, which illustrates, when ocmpared to the curve segment $P_0 - P_1$, that brake pressure build-up occurs at a slower rate in the lower pressure rate and at a higher rate in the higher pressure range.

With brake pressure in brake cylinder 3 restored substantially to the original pressure as established by operation of the brake valve 7, that is, pressure $P_4$, let it be assumed that the road surface at this point is characterized by a lower friction coefficient than that prevailing at the start of the above-described cycle of operation. In response to the poor road condition, sensor 20 again causes control valve 2 to be operated to position V so that pressure in brake cylinder 3 is reduced as represented by curve segment $P_4 - P_5$ in graph A before said sensor causes said control valve to be switched to position C in which pressure $P_5$, which is reached after a time $T_5$, is maintained while the wheel recovers normal rotation during the time interval $T_5 - T_6$. This recovery period is represented by curve segment $P_5 - P_6$ on graph A, said pressure $P_6$ being equivalent to pressure $P_5$.

When rotational wheel speed has been restored to a speed corresponding to a linear speed of the vehicle at time $T_6$, control valve 2 is operated to position S, and, in the manner above set forth, brake pressure begins to build up in brake cylinder 3 with the resulting pressure differential between the opposite sides of throttle piston 11 causing said piston to move upwardly until a state of euqilibrium is ahcieved at time $T_7$. But due to the lower pressure $P_6$ prevailing in brake cylinder 3 at time $T_6$ (as compared to pressure $P_3$ prevailing at the corresponding phase of the previous cycle of operation), a greater differential is established across piston 11 so that said piston moves upwardly a greater amount to a position in which a smaller throttle area is established between said piston and throttle pin 14. Thus, the rate of build-up of pressure in brake cylinder 3, subsequently to restoration of the wheel to normal rotation, in this instance procedes initially at a slower rate than in the previously described cycle in which a better road surface condition was assumed.

If poor road conditions still prevail to the extent that a wheel-slip threshold is again sensed by the sensor device 20, the apparatus functions again, in the manner above described, for restoring the wheel to normal rotation. Depending on the gravity of the road conditions, the anit-skid apparatus operates to effect restoration of normal wheel rotation in a shorter period of time when a higher static friction coefficient of road surface exists than when a lower coefficient prevails, said period of time being determined by the actual road condition at the time wheel-slip tends to occur.

Figure 2:
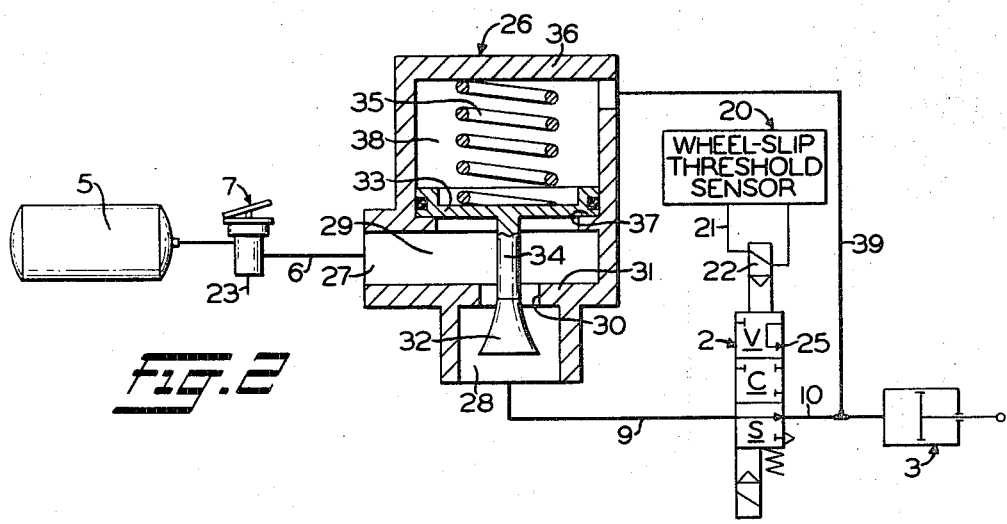
FIG. 2 is a schematic view, partly in section, of the invention with one component thereof modified.

As shown in FIG. 2, the modulating valve device 1 of FIG. 1 is replaced by a modified modulating valve device 26 having a fluid pressure inlet port 27 to which pipe 6 from brake valve 7 and reservoir 5 is connected. Modulating valve device 26 is also provided with a delivery port 28 which communicates with inlet port 27 via a supply chamber 29 adjacent said inlet port and a circular opening 30 of predetermined dimension formed in a separating or inner wall 31 between said delivery port and said supply chamber. Delivery port 28 is connected to brake cylinder 3 via pipes 9 and 10 in which control valve device 2 is interposed.

Unlike the opening 16 in throttle piston 11 in FIG. 1, throttle opening 30 of modulating valve device 26, as above noted, is positionally fixed in separating wall 31. A piston operated throttle assembly operably disposed in the modulating valve device 26 comprises a throttle member 32 carried by a piston 33, said throttle member being fixed to the end of an axially aligned stem 34 extending coaxially from the lower side of said piston, as viewed in the drawing, concentrically through the opening 30. Throttle member 32 is generally disposed within the opening 30 and is axially adjustable relative thereto by action of piston 33 to cooperate with said opening in providing an infinitely variable throttling action.

Throttle member 32 is generally bell-shaped with its smallest-diameter end fixed to the end of stem 34 opposite piston 33. A cross-sectional area of throttle member 32 presents concaved curved sides, as opposed to the convex curved sides of the cross-sectional area of throttle pin 14 in FIG. 1, so that the gradient of the curved sides decreases gradually toward the largest-diameter end. Piston 3 and, therefore, throttle memeber 32 are biased donwwardly by a spring 35 compressed between said piston and an end wall 36 opposite separating wall 31 toward respective full-flow positions in which said piston makes abutting contact with an annular shoulder 37 formed in the modualting valve 26 and the smallest-diameter end of the throttle member is positioned in the opening 30, as shown in FIG. 2. The lower side of piston 33 is subject to fluid pressure prevailing in supply chamber 29 while the upper or opposite side of said pisotn is subject to pressure prevailing in a spring or balance chamer 38 in which spring 35 is disposed and which reflects the fluid pressure prevailing in brake cylinder 3 in that said balance chamber is connected via a branch pipe 39 to pipe 10 leading to said brake cylinder.

When the vehicle brakes are in a released condition, the several components of the apparatus shown in FIG. 2 occupy the positions in which they are shown in the drawing and in which brake cylinder 3 is vented to atmosphere via vent port 23 in the brake valve device 7 via pipe 10, control valve 2, pipe 7, delivery port 28, opening 30, supply chamber 29, inlet port 27, and pipe 6.

When the operator initiates a brake application by operating the brake valve 7 to a selected position, fluid pressure in brake cylinder 3 is built up at a rate indicated by the curve segment $P_o - P_1$ in graph A. Although supply pressure in pressure chamber 29 acts on the adjacent lower side of piston 33, the same pressure that is supplied to brake cylinder 3 is also transmitted via branch pipe 39 to balance chmaber 38 of modulating valve device 26 so that said piston is maintained in its free-flow position in abutting contact with shoulder 37.

Again, if road conditions are assumed to be such that, when pressure in brake cylinder 3 reaches pressure $P_1$ at time $T_1$, the sensor 20 detects imminent wheel-slip, the apparatus shown in FIG. 2 functions similarly to that shown in FIG. 1 in effecting sequential operation of control valve device 2 to position V in which a reduction of brake pressure in brake cylinder 3 as well as in spring chamber 38 ($P_1 - P_2$ at time $T_2$) is effected, and to position C in which the wheel is restored to normal rotation ($P_2 - P_3$ at time $T_3$).

When the pressure in spring chamber 38 has been reduced, as above noted, along with that in brake cylinder 3, pressure in supply chamber 29 acting on the lower adjacent side of piston 33 is effective for moving said piston upwardly to a restricted-flow position. The amount of upward movement of piston 33 and, therefore, the exact position of throttle member 32 relative to opening 30, as in the operation of the apparatus shown in FIG. 1, is determined by the degree of road friction coefficient which, in turn, in cooperation with the sensor 20, determines the degree of fluid pressure reduction in balance chamber 38. Thus, the greater is the reduction of fluid pressure in balance chamber 38, the greater is the upward movement of piston 33, and consequently the more restricted is the flow area between opening 30 and throttle member 32. Thus, when control valve 2 is restored to position S at the end of phase $P_2 - P_3$ at time $T_3$, renewed build-up of pressure in brake cylinder 3, and therefore in balance chamber 38, is restricted by the flow area between opening 30 and throttle member 32, said flow area, however, gradually increasing as build-up of pressure in said balance chamber gradually causes piston 33 to move downwardly until it and said throttle member are restored to their respective full-flow positions, above defined, at time $T_4$ when pressure $P_4$ prevails in said brake cylinder and said balance chamber.

If wheel-slip imminency is again detected by the sensor device 20, the apparatus shown in FIG. 2 proceeds through another cycle in the manner described for restoring the vehicle wheel to normal rotation.

Figure 4:
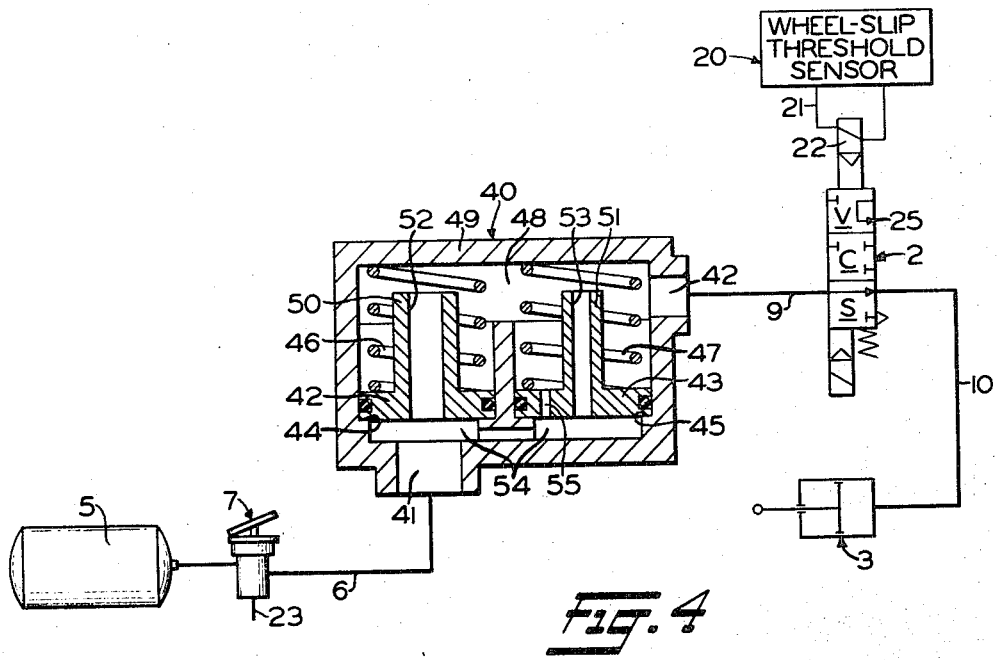
FIG. 4 is a schedmatic view, partly in section, of still another embodiment of the invention.

The arrangement shown in FIG. 4 differs from the apparatus shown in FIGS. 1 and 2 in that a further modified modulating valve device 40 is interposed in the system between pipes 6 and 9 in place of either of the modulating valve devices 1 or 26.

Modulating valve device 40 has an inlet port 41 and a delivery port 42 connected to pipes 6 and 9, respectively, and is also provided with a pair of throttle pistons 42 and 43 operably disposed therein in axially parallel relationship to each other. Throttle pistons 42 and 43 are biased downwardly, as viewed in the drawing, toward normal free-flow positions in abutting contact with internally disposed annular shoulders 44 and 45 by a pair of springs 46 and 47, respectively, disposed in a spring or balance chamber 48 from which delivery port 42 opens. Springs 46 and 47 are compressed between the upper sides of pistons 42 and 43, respectively, as viewed in the drawing, and an oppositely disposed end wall 49 of the modulating valve device.

Throttle pistons 42 and 43 have tubular throttle valve members 50 and 51, respectively, extending coaxially from the upper sides thereof into spring chamber 48, said throttle valve members terminating short of end wall 49 with sufficient clearance therebetween to permit uninhibited flow of fluid pressure, when said pistons are in their free-flow positions, through respective bores 52 and 53 extending coaxially through said throttle valve members and normally providing communication between said spring chamber and a fluid pressure supply chamber 54 adjacent the lower sides of the pistons and into which inlet port 41 opens. Throttle piston 43 is provided with a restricted passageway 55 extending axially therethrough for communicating the opposite sides of said piston with each other at all times.

Figure 5:
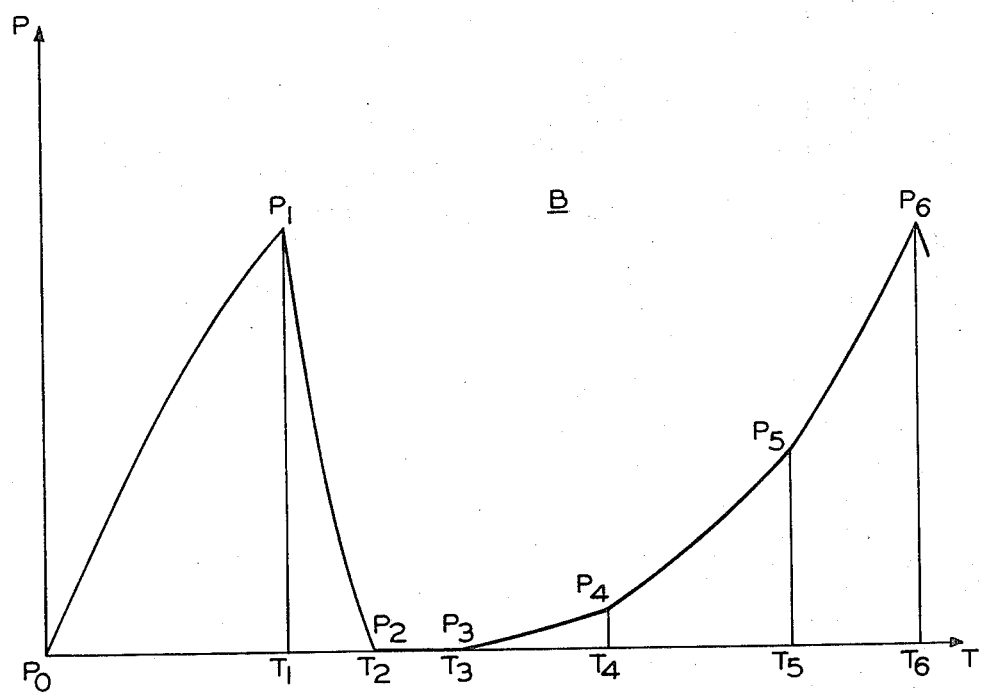
FIG. 5 is a pressure versus time graph relating to the embodiment shown in FIG. 4.

The apparatus, as appears in FIG. 4, shows all components in the respective positions occupied thereby in the brake release situation with brake cylinder 3 vented to atmosphere via vent port 23 on brake valve device 7 through the usual course via control valve device 2 and modulating valve device 40. In describing the operation of the apparatus shown in FIG. 4, reference will be made to a pressure (P) versus time (T) graph B shown in FIG. 5.

When the operator initiates a brake application by operating brake valve device 7 to a selected position commensurate with the desired degree of braking, fluid under pressure is supplied from reservoir 5 to brake cylinder 3 via pipe 6, inlet port 41, supply chamber 54, bores 52 and 53, spring chamber 48, delivery port 42, pipe 9, control valve device 2 in position S, and pipe 10. Pressure P builds up in brake cylinder 3 according to curve segment $P_o - P_1$ of graph B until such pressure attains an effective pressure $P_1$ at time $T_1$. Since, as was similarly noted in connection with the apparatus shown in FIG. 1, only a nominal or negligible pressure differential occurs between inlet port 41 and delivery port 42 during initial supply of fluid pressure to brake cylinder 3, springs 46 and 47 are effective for maintaining throttle pistons 42 and 43 in their respective free-flow positions.

If the wheel-slip threshold sensor 20, however, senses a tendency of wheel-slip due to the braking action, said sensor, in cooperation with control valve device 2 and in manner similar to that described in connection with apparatus shown in FIGS. 1 and 2, causes a reduction of brake pressure in brake cylinder 3. In this instance, however, the sensor is set or adjusted (in a manner not deemed essential to an understanding of the invention) to permit brake cylinder pressure to be reduced after a time $T_2$ to substantially a zero pressure $P_2$, as represented by a curve segment $P_1-P_2$ on graph B, before the second signal or control impulse is emitted for causing the control valve device 2 to be operated to cutoff position C. With control valve 2 in position C and therefore supply of fluid pressure to brake cylinder 3 cut off, the vehicle wheel (not shown), after a time $T_3$ or a period represented by a curve segment $P_2 - P_3$ on graph B, resumes a rotational speed equivalent to linear vehicle speed, at which point control valve 2 is restored to fluid pressure supply position S.

The prevailing pressure acting on the upper sides of throttle pistons 42 and 43 adjacent spring chamber 48 quickly attempt to equalize into brake cylinder 3, thereby establishing a differential between inlet port 41 and delivery port 42, or across the opposite sides of said throttle pistons. As a result of such pressure differential, pistons 42 and 43 are moved upwardly until the upper ends of throttle valve members 50 and 51 rest against end wall 49 to cut off free flow of fluid pressure to the brake cylinder 3 via bores 52 and 53 and to restrict such flow and consequent build-up of fluid pressure in said brake cylinder to a restricted rate through restricted passageway 55. When pressure in spring chamber 48 has built up, as represented by curve segment $P_3 - P_4$ on graph B, the pressure $P_4$, along with the action of spring 47, is sufficient to overcome pressure in chamber 54 acting on the lower side of throttle piston 43, so that said piston at time $T_4$ moves downwardly to cause valve member 51 to be unseated from end wall 49 and thereby permit flow of fluid pressure through both bore 53 and restricted passageway 55. Further build-up of pressure now occurs as shown by the curve segment $P_4 - P_5$ on graph B, so that at time $T_5$ pressure $P_5$, along with action of spring 46, causes throttle piston 42 to be moved downwardly and consequent opening of valve member 50. At this point fluid pressure flows through all throttle openings 52, 53 and 55 so that build up and equalization of fluid pressure in the brake cylinder 3 occurs at an even greater rate as indicated by curve segment $P_5 - P_6$ until pressure $P_6$ at time $T_6$ is reached, said perssure $P_6$ being substantially equivalent to the originally established pressure $P_1$.

It should be noted that, since the diameter of throttle valve member 51 is smaller than that of throttle valve member 50, the effective pressure area on the upper side of throttle piston 43 is larger than that of throttle piston 42, although the respective pressure areas on the lower sides of said throttle pistons are equal. For this reason, piston 43 is moved downwardly at pressure $P_4$ which is less than pressure $P_5$ at which piston 42 is moved downwardly.

Should wheel-slip imminency be detected again, the apparatus shown in FIG. 4 will function through a new cycle, as above described, to prevent skidding of the wheel.

Having now described the invention, what we claim as new and desire to secure by Latters Patent is:

1. Anti-skid apparatus for vehicle wheels comprising:

a. a source of fluid under pressure;
   b. brake-applying means for exerting a braking force on the vehicle wheel according to the degree of fluid pressure supplied thereto;
   c. manually operable means interposed between said source of fluid under pressure and said brake-applying means for effecting supply of fluid pressure from said source to said brake-applying means at a selected degree;

d. control means interposed between said manually operable means and said brake-applying means, said control means being operable to:
  i. a supply position in which fluid pressure from the source via the manually operable means may be supplied to the brake-applying means at the selected degree;
  ii. a vent position in which fluid pressure supply to the brake-applying means is cut off and the degree of fluid pressure thereat is reduced, and
  iii. a cut-off position in which the brake-applying means is cut off from both supply and reduction of fluid pressure;

e. wheel-slip detector means responsive to a predetermined wheel-slip threshold, to a predetermined partial restoration of the wheel to normal rotation, and to a complete restoration of the wheel to normal rotation for effecting operation of said control means to said vent, cut-off, and supply positions, respectively; and f. modulating means interposed between said manually operable means and said control means and comprising:
  i. a tapered throttle pin,
  ii. biasing means,
  iii. a piston member biased by said biasing means in one direction coaxially relative to said throttle pin toward a normal free-flow position, in which fluid pressure may flow unrestrictedly therethrough, and being operable in an opposite direction toward an initially established restricted flow position relative to the throttle pin in response to establishment of a pressure differential thereacross initiated at the onset of resumption of fluid pressure flow to the brake-applying means upon operation of said control means to its said supply position, said piston member having a concentric circular opening therein for accommodating said throttle pin during such relative axial movement therebetween and cooperating with the throttle pin for providing a fluid pressure flow area variable in accordance with their respective positions relative to each other during restoration of fluid pressure to the brake-applying means,
  iv. said throttle pin being disposed such as to have the smallest diameter portion thereof positioned in said concentric opening in the free-flow position and to have the largerdiameter portion thereof positioned in said concentric opening in the restricted flow position,
  v. the initially established restricted-flow position being determined by the degree of fluid pressure prevailing at the brake-applying means at the onset of said resumption of fluid pressure flow thereto.

2. Anti-skid apparatus for vehicle wheels, as set forth in claim 1, wherein said throttle pin is characterized by an elongated paraboloidal shape with the largest diameter thereof being slightly smaller than the diameter of said concentric opening.

3. Anti-skid apparatus for vehicle wheels, as set forth in claim 1 wherein said flow rate control means comprises a casing in which said throttle pin is positionally fixed relative to the piston member.

4. Anti-skid apparatus for vehicle wheels comprising:

a. a source of fluid under pressure;

b. brake-applying means for exerting a braking force on the vehicle wheel according to the degree of fluid pressure supplied thereto;

c. manually operable means interposed between said source of fluid under pressure and said brake-applying means for effecting supply of fluid pressure from said source to said brake-applying means at a selected degree;

d. control means interposed between said manually operable means and said brake-applying means, said control means being operable to:
  i. a supply position in which fluid pressure from the source via the manually operable means may be supplied to the brake-applying means at the selected degree;
  ii. a vent position in which fluid pressure supply to the brake-applying means is cut off and the degree of fluid pressure thereat is reduced, and
  iii. a cut-off position in which the brake-applying means is cut off from both supply and reduction of fluid pressure;

e. wheel-slip detector means responsive to a predetermined wheel-slip threshold, to a predetermined partial restoration of the wheel to normal rotation, and to a complete restoration of the wheel to normal rotation for effecting operation of said control means to said vent, cut-off, and supply positions, respectively; and f. modulating means interposed between said manually operable means and said control means and comprising:
  i. a casing,
  ii. an inner wall disposed in said casing and having a circular opening formed therein,
  iii. a piston operated throttle assembly including a piston member reciprocably disposed in said casing in axial alignment with said circular opening, and a tapered throttle member fixed to and extending coaxially from one side of said piston member through said circular opening,
  iv. biasing means for biasing said throttle assembly axially in one direction toward a free flow position, in which fluid pressure may flow unrestrictedly therethrough, and being operable in an axially opposite direction toward an initially established restricted flow position relative to said circular opening in response to establishment of a pressure differential thereacross initiated at the onset of resumption of fluid pressure flow to the brake-applying means upon operation of said control means to said supply position,
  v. said throttle member being so disposed as to have the smallest-diameter portion thereof positioned in said circular opening in the free-flow position of the throttle assembly and to have a larger-diameter portion thereof positioned in said circular opening in the restricted-flow position of the throttle assembly for providing a fluid pressure flow area variable in accordance with the axial position of the throttle assembly relative to the opening,
  vi. the initially established restricted-flow position being determined by the degree of fluid pressure prevailing at the brake-applying means at the onset of said resumption of fluid pressure flow thereto.

5. Anti-skid apparatus for vehicle wheels, as set forth in claim 4, wherein said throttle member is substantially bellshaped with the smallest diameter end being affixed to one end of a stem fixed to said one side of said piston member.

6. Anti-skid apparatus for vehicle wheels comprising:

a. a source of fluid under pressure;
b. brake-applying means for exerting a braking force on the vehicle wheel according to the degree of fluid pressure supplied thereto;
c. manually operable means interposed between said source of fluid under pressure and said brake-applying means for effecting supply of fluid pressure from said source to said brake-applying means at a selected degree;
d. control means interposed between said manually operable means and said brake-applying means, said control means having:
 i. a supply position in which fluid pressure from the source via the manually operable means may be supplied to the brake-applying means at the selected degree,
 ii. a vent position in which fluid pressure supply to the brake-applying means is cut off and the degere of fluid pressure prevailing thereat is reduced, and
 iii. a cut-off position in which the brake-applying means is cut off from both supply and reduction of fluid pressure;
e. wheel-slip detector means responsive to a predetermined wheel-slip threshold, to a predetermined partial restoration of the wheel to normal rotation, and to a complete restoration of the wheel to normal rotation for effecting operation of said control means to said vent, cut-off, and supply position, respectively; and
f. modulating means coomprising:
 i. a casing;
 ii. a pair of independently operable throttle pistons disposed in said casing in axially parallel relation to each other,
 iii. one of said throttle pistons having a larger effective pressure area on one side than the effective pressure area of the corresponding side of the other throttle pistons and both pistons having equal effective pressure areas on the respective opposite sides thereof,
 iv. said one of said throttle pistons having restricted passage means formed therein for constantly communicating the opposite sides of both pistons with each other,
 v. each of said throttle pistons having a tubular valve member extending coaxially from said one side and said corresponding side, respectively, toward an end wall of said casing, said tubular valve members having respective coaxial passageways extending therethrough; and
 vi. a pair of springs for respectively biasing each of said throttle pistons independently in one direction toward respective free-flow positions in which fluid pressure may flow unrestrictedly between opposite sides of said pistons via said passageways, said pistons being operable in an opposite direction, in response to establishment of respective pressure differentials thereacross initiated at the onset of said resumption of fluid pressure flow to the brake-applying means, toward respective restricted-flow positions in which the free ends of said tubular valve members make abutting contact with said end wall for cutting off said free flow through said passageways and restricting flow of fluid pressure through said restricted passage means,
 vii. said pistons being restorable to their respective free flow positions upon equalization of fluid pressure on the opposite sides thereof in sequential order according to said effective pressure areas of said one side and said corresponding side of said pistons, respectively.

* * * * *